United States Patent
Wu

(10) Patent No.: US 11,012,496 B2
(45) Date of Patent: May 18, 2021

(54) MOBILE-OPTIMIZED FILE TRANSFER MECHANISM BASED ON QR CODE

(71) Applicant: Citrix Systems, Inc., Fort Lauderdale, FL (US)

(72) Inventor: Hao Wu, Nanjing (CN)

(73) Assignee: Citrix Systems, .Inc., Fort Lauderdale, FL (US)

( * ) Notice: Subject to any disclaimer, the term of this patent is extended or adjusted under 35 U.S.C. 154(b) by 144 days.

(21) Appl. No.: 15/674,169

(22) Filed: Aug. 10, 2017

(65) Prior Publication Data

US 2019/0052697 A1 Feb. 14, 2019

(51) Int. Cl.
*H04L 29/08* (2006.01)
*G06K 7/10* (2006.01)
*G06K 7/14* (2006.01)
*H04W 88/02* (2009.01)

(52) U.S. Cl.
CPC .......... *H04L 67/06* (2013.01); *G06K 7/10722* (2013.01); *G06K 7/10881* (2013.01); *G06K 7/1417* (2013.01); *G06K 2007/10524* (2013.01); *H04W 88/02* (2013.01)

(58) Field of Classification Search
CPC ............................ H04L 67/06; G06K 7/10722; G06K 7/10881; G06K 7/1417; G06K 2007/10524; H04W 88/02
See application file for complete search history.

(56) References Cited

U.S. PATENT DOCUMENTS

| 7,124,953 | B2* | 10/2006 | Anttila | G06K 1/18 |
| | | | | 235/472.02 |
| 9,600,701 | B1* | 3/2017 | Chien | H04B 10/116 |
| 2006/0071077 | A1* | 4/2006 | Suomela | G06K 7/1095 |
| | | | | 235/462.01 |
| 2012/0230436 | A1* | 9/2012 | Yoon | G06F 16/955 |
| | | | | 375/240.25 |
| 2013/0016710 | A1* | 1/2013 | Shinohara | H04M 1/7253 |
| | | | | 370/338 |

(Continued)

FOREIGN PATENT DOCUMENTS

JP    2007-156969 A    6/2007

OTHER PUBLICATIONS

International Search Report and Written Opinion for PCT Appl. No. PCT/US2018/045730, dated Nov. 22, 2018.

(Continued)

*Primary Examiner* — Dhairya A Patel
*Assistant Examiner* — Sujana Khakural
(74) *Attorney, Agent, or Firm* — Foley & Lardner LLP

(57) ABSTRACT

Described embodiments may provide transferring a file to a mobile device via scanning quick response codes displayed via a display output device. A media device in communication with a server may receive a request to access a file on the server. A file converter of the media device may encode the file obtained from the server into a plurality of quick response (QR) codes. The media device may display the plurality of QR codes via a display output device. A mobile device may scan each of the plurality of QR codes displayed on the display output device. A file downloader of the mobile device may interpret each of the scanned plurality of QR codes to form a file on the mobile device.

18 Claims, 8 Drawing Sheets

(56) References Cited

U.S. PATENT DOCUMENTS

| | | | | |
|---|---|---|---|---|
| 2013/0134212 A1* | 5/2013 | Chang | ............... | G06F 11/0742 |
| | | | | 235/375 |
| 2013/0153666 A1* | 6/2013 | Edwards | ............. | G06K 7/1095 |
| | | | | 235/462.25 |
| 2014/0084067 A1* | 3/2014 | Vanderhulst | ......... | H04B 10/116 |
| | | | | 235/462.01 |
| 2014/0197232 A1* | 7/2014 | Birkler | ................. | G06F 21/313 |
| | | | | 235/375 |
| 2016/0359666 A1* | 12/2016 | Ledwith | ................. | H04L 67/06 |
| 2017/0255805 A1* | 9/2017 | Ebrahimi | ................. | G09C 5/00 |
| 2018/0031260 A1* | 2/2018 | Bernbom | ................ | F24F 11/62 |
| 2018/0114045 A1* | 4/2018 | Ebrahimi | ............ | G06K 7/1417 |

OTHER PUBLICATIONS

International Preliminary Report on Patentability for International Appl. No. PCT/US2018/045730, dated Feb. 20, 2020.
Examination Report on CA Appl. No. 3072046 dated Mar. 18, 2021.
Examination Report on EP Appl. No. 18762427.5 dated Jan. 14, 2021.

* cited by examiner

MOBILE-OPTIMIZED FILE TRANSFER MECHANISM BASED ON QR CODE

FIELD OF THE DISCLOSURE

The present application generally relates to transferring files to client devices. In particular, the present application relates to systems and methods for transferring a file to a mobile device via scanning quick response codes displayed via a display output device.

BACKGROUND OF THE DISCLOSURE

A device may have difficult downloading or otherwise accessing files located on a data repository that is not communicatively connected to the client. Current techniques to retrieve the file from the data repository for the device may involve the use of specialized hardware or software or may incur security risks.

BRIEF SUMMARY OF THE DISCLOSURE

The present disclosure is directed towards systems and methods for transferring a file to a mobile device via scanning quick response codes displayed via a display output device. The file may be stored at a file server or a database not directly accessible by the mobile device. If the file server is connected to the wireless network (e.g., the Internet) as the mobile device, a physical wired connected may be used to transfer the file requested by the mobile device. Such a mechanism, however, may fail without the installation of a specialized driver or support by an operating system running on the mobile device. In addition, the specific cable for the wired connection may not be readily available. Furthermore, if the file server is deployed in an internal network (e.g., an enterprise Intranet such as a virtual private network (VPN)) not accessible to the mobile device, the mobile device may not have direct access or permissions to the file server. In such situations, the mobile device may send a request to a bridge device connected to the internal network. The bridge device in turn may access the file server via the internal network, copy the requested file from the file server, and then send the file to the mobile device. This procedure, however, may not be secure, as the file is physically stored at the bridge device prior to delivery to the client.

To download the file from the file server without such encumbrances, the present systems and methods may provide a mechanism for mobile devices to download files by scanning a stream of quick response (QR) code images rendered on the display output device of a target device in the presence of the mobile device. The QR code may dynamically change in sequence one after another to convey information or data to the mobile device. The target device may be the file server itself or may be a media device that may access the file server via a network. If the target device is the media device, a file converter executing on the media device may retrieve the requested file from the file server and use a file convert to convert the retrieve file to the stream of QR code images for display on the display output device. Using the stream of QR code images, a file downloader running on the mobile device may interpret and generate the requested file.

In one scenario, a user may attempt to access a file stored at the file server from the mobile device. With no access to the file server, the user may be unsuccessful in accessing the file in the initial attempt. The user may then use the display of the media device that may access the file server to locate the file on the file server to download from the media device. In some embodiments, the media device may be the same device as the file server. The media device in turn may launch the file convert to download the file from the file server and then to convert the file into a stream of QR codes.

To generate the stream of QR codes, the file converter of the media device may first encode the file into a long string. The file converter may then divide the long string into multiple portions based on a content limit of the QR code. The content limit of a single QR code may be 3 kilobytes at maximum. With the long string divided into multiple portions, the file converter may convert each portion into a single QR code image and may insert sequence information into each QR code image. The sequence information may specify the order of the QR code image. If length of the stream of QR codes is above a threshold length, the media device may display a prompt warning the user of a potentially long download time. The file converter may combine all the QR code images generated for the requested file to form a stream of QR code images. The file converter may also generate an initial QR code image to prefix to the stream of QR code images. The initial QR code image may include information on an identifier of the media device (e.g., Internet Protocol (IP) address, Media Access Control (MAC) address, or a Bluetooth Universally Unique Identifier (UUID), etc.) and a total length of QR code images in the stream.

Once the QR code images are combined, the media device may render the initial QR code image of the stream onto the display of the media device for scanning by the mobile device. The initial QR code image may be rendered and presented on the display of the media device for a predefined amount of time (e.g., 10 to 45 seconds). During the predefined amount of time, an image scanner of the mobile device may be pointed by the user at the display of the media device to scan the prefixed initial QR code. Using the information imprinted in the initial QR code, the mobile device may initiate establishment of communications with the media device (e.g., using Internet or the Bluetooth) for downloading the request file.

If the attempt to establish communications with the media device is successful, the mobile device may continue to scan the stream of QR code images from the media device in a "controlled mode." With communications established with the media device, the file downloader running on the mobile device may first send a start signal to the media device. Receipt of the start signal may trigger the media device to initiate playing of the stream of QR code images on the display. Each time the mobile device scans the QR code image, the file downloader may interpret the QR code image and construct the requested file. The file downloader may also send back an acknowledgement signal to the media device. In the meanwhile, the media device may wait for receipt of the acknowledgement signal. Upon receipt of the acknowledgement signal, the media device may play the next QR code image in the stream. If the QR code image is sent in the wrong sequence, the file downloader may request the expected QR code image in the sequence in the stream.

On the other hand, if the attempt to establish communications with the media device is unsuccessful, the mobile device may continue to scan the stream of QR code images from the media device in an "easy mode." Instead of communicating acknowledgment signal each time a QR code image is scanned, the media device may play the stream of QR code images. Each time a new QR code image appears on the display, the mobile device may scan the QR code image and may interpret the scanned QR code image to compose the requested file. If any QR code image in the stream is not scanned, the mobile device may scan the stream of QR code image again when the stream is replayed at a subsequent time. In either the controlled mode or the easy mode, the mobile device may be able to construct the requested file without direct access or communicative connection with the file server storing the file.

At least one aspect of this disclosure is directed to a method of transferring a file to a mobile device via scanning quick response codes displayed via a display output device. A media device in communication with a server may receive a request to access a file on the server. A file converter of the media device may encode the file obtained from the server into a plurality of quick response (QR) codes. The media device may display the plurality of QR codes via a display output device. A mobile device may scan each of the plurality of QR codes displayed on the display output device. A file downloader of the mobile device may interpret each of the scanned plurality of QR codes to form a file on the mobile device.

In some embodiments, the server may include the media device. In some embodiments, the mobile device may not directly access the server. In some embodiments, receiving the request to access the file on the server may further include receiving the request via selection of a user interface element displayed via the display output device.

In some embodiments, encoding the file obtained from the server may include encoding the file into the plurality of QR codes by encoding the file into a string. In some embodiments, encoding the file obtained from the server may include encoding the file into the plurality of QR codes by dividing the string into a plurality of parts based on a content limit of a QR code. In some embodiments, encoding the file obtained from the server may include encoding the file into the plurality of QR codes by converting each of the plurality of parts into one of the plurality of QR codes. Each one of the plurality of QR codes may include a sequence number.

In some embodiments, encoding the file obtained from the server may include combining the plurality of QR codes into a stream of QR codes. The stream of QR codes may include one of a sequence of files for each of the plurality of QR codes or a video of the plurality of QR codes. In some embodiments, displaying the plurality of QR codes via the display output device may include displaying each of the plurality of QR codes sequentially for a predetermined time period.

In some embodiments, displaying the plurality of QR codes via the display output device may include scanning each of the plurality of QR codes via a camera of the mobile device reading each of the plurality of QR codes as displayed on the display output device. In some embodiments, displaying the plurality of QR codes via the display output device may include synchronizing one of the scanning or the interpreting with the media device's displaying of the plurality of QR codes. In some embodiments, interpreting each of the scanned plurality of QR codes may include combining each of the interpreted scanned plurality of QR codes to form the file.

Another aspect of this disclosure is directed to a system for transferring a file to a mobile device via scanning quick response codes displayed via a display output device. A media device in communication with a server may receive a request to access a file on the server. A file converter of the media device may encode the file obtained from the server into a plurality of quick response (QR) codes. The media device may display the plurality of QR codes via a display output device. A mobile device may scan each of the plurality of QR codes displayed on the display output device. A file downloader of the mobile device may interpret each of the scanned plurality of QR codes to form a file on the mobile device.

In some embodiments, the server may include the media device. In some embodiments, the mobile device may not directly access the server. In some embodiments, the media device may receive the request via selection of a user interface element displayed via the display output device.

In some embodiments, the file converter may encode the file into the plurality of QR codes by encoding the file into a string. In some embodiments, the file converter may encode the file into the plurality of QR codes by dividing the string into a plurality of parts based on a content limit of a QR code. In some embodiments, the file converter may encode the file into the plurality of QR codes by converting each of the plurality of parts into one of the plurality of QR codes. Each one of the plurality of QR codes may include a sequence number.

In some embodiments, the file converter may combine the plurality of QR codes into a stream of QR codes. The stream of QR codes may include one of a sequence of files for each of the plurality of QR codes or a video of the plurality of QR codes. In some embodiments, the media device may display each of the plurality of QR codes sequentially for a predetermined time period.

In some embodiments, the mobile device may scan each of the plurality of QR codes via a camera of the mobile device reading each of the plurality of QR codes as displayed on the display output device. In some embodiments, the file downloader may synchronize one of the scanning or the interpreting with the media device's displaying of the plurality of QR codes. In some embodiments, the file downloader may combine each of the interpreted scanned plurality of QR codes to form the file.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
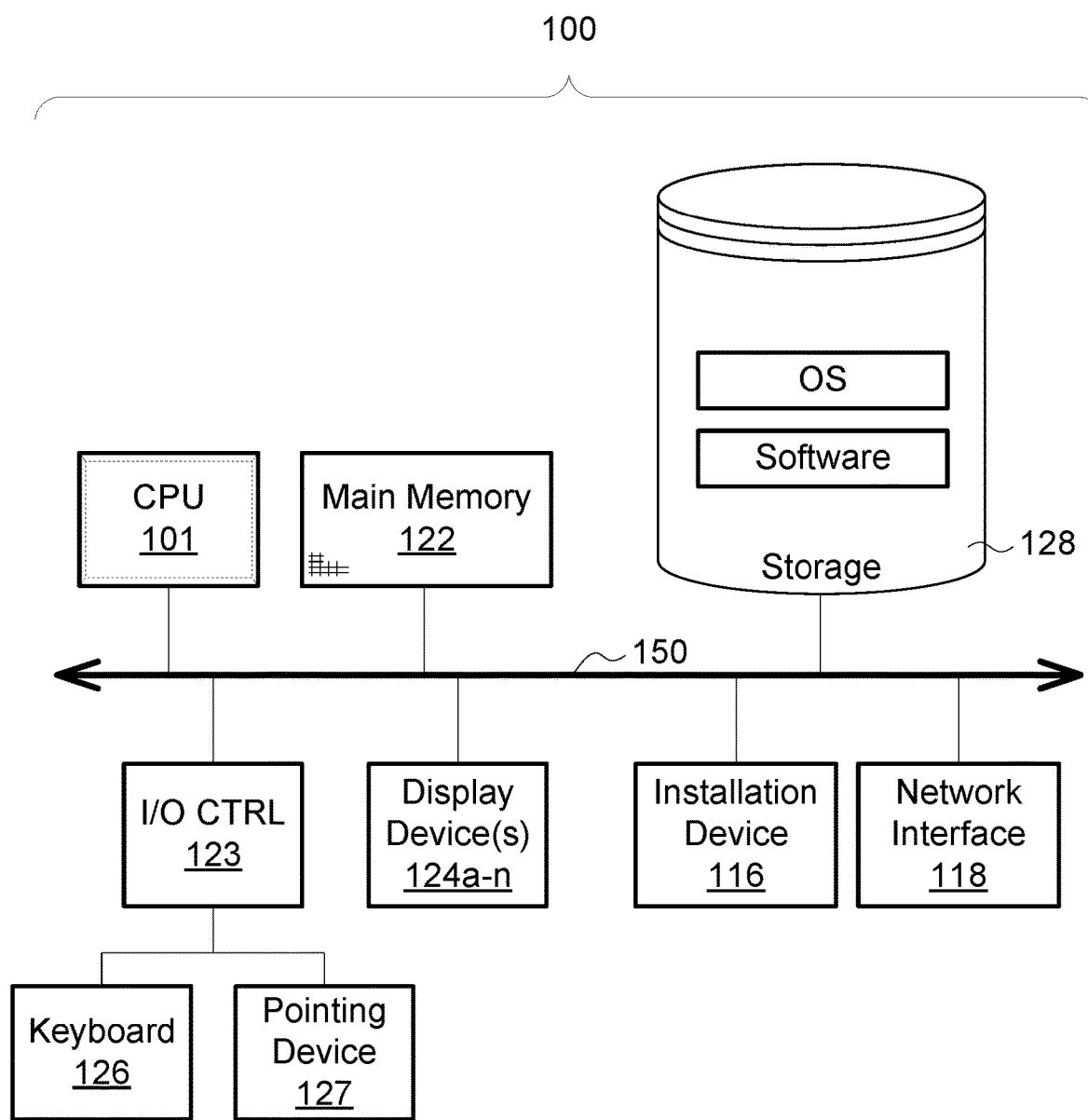
FIGS. 1A-1D are block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for transferring a file to a mobile device via scanning quick response codes displayed via a display output device.

A. Computing Environment

Figure 1B:
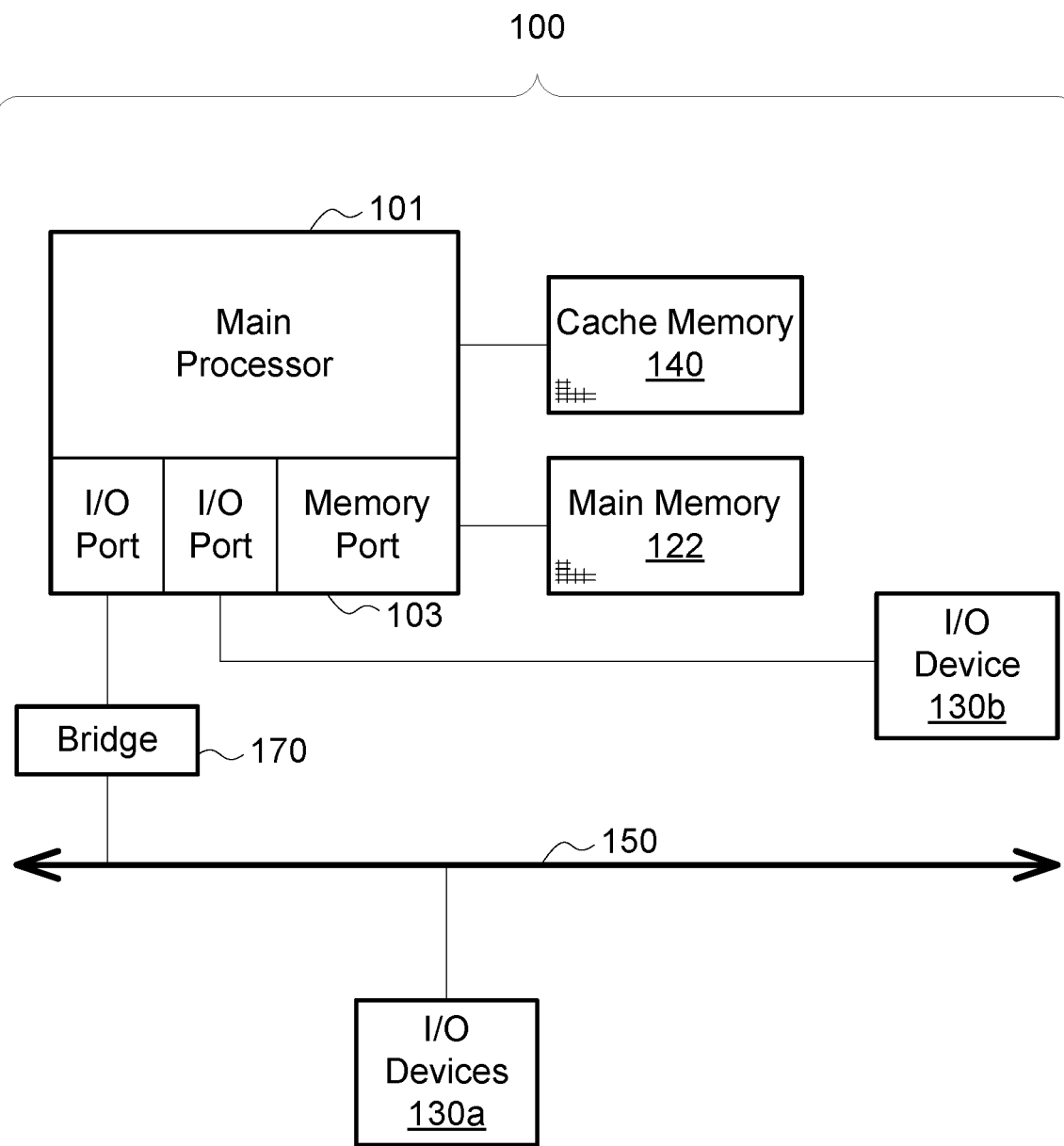

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
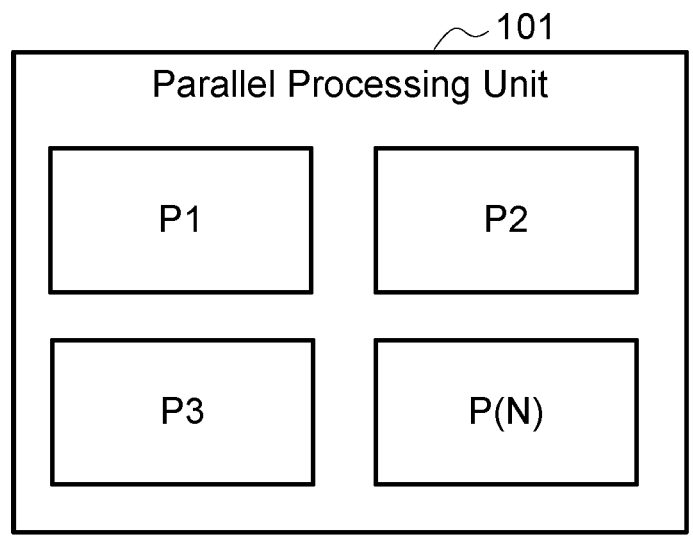

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
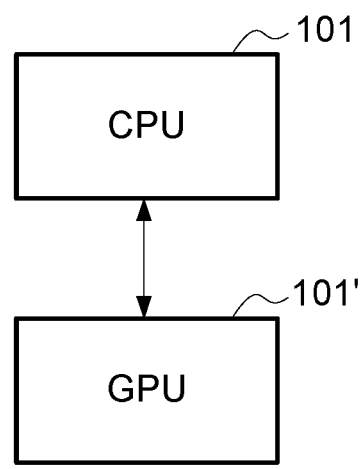

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Systems and Methods for Transferring a File to a Mobile Device Via Scanning Quick Response Codes Displayed Via a Display Output Device The present disclosure is directed towards systems and methods for transferring a file to a mobile device via scanning quick response codes displayed via a display output device. The file may be stored at a file server or a database not directly accessible by the mobile device. If the file server is connected to the wireless network (e.g., the Internet) as the mobile device, a physical wired connected may be used to transfer the file requested by the mobile device. Such a mechanism, however, may fail without the installation of a specialized driver or support by an operating system running on the mobile device. In addition, the specific cable for the wired connection may not be readily available. Furthermore, if the file server is deployed in an internal network (e.g., an enterprise Intranet such as a virtual private network (VPN)) not accessible to the mobile device, the mobile device may not have direct access or permissions to the file server. In such situations, the mobile device may send a request to a bridge device connected to the internal network. The bridge device in turn may access the file server via the internal network, copy the requested file from the file server, and then send the file to the mobile device. This procedure, however, may not be secure, as the file is physically stored at the bridge device prior to delivery to the client.

To download the file from the file server without such encumbrances, the present systems and methods may provide a mechanism for mobile devices to download files by scanning a stream of quick response (QR) code images rendered on the display output device of a target device in the presence of the mobile device. The QR code may dynamically change in sequence one after another to convey information or data to the mobile device. The target device may be the file server itself or may be a media device that may access the file server via a network. If the target device is the media device, a file converter executing on the media device may retrieve the requested file from the file server and use a file convert to convert the retrieve file to the stream of QR code images for display on the display output device. Using the stream of QR code images, a file downloader running on the mobile device may interpret and generate the requested file.

In one scenario, a user may attempt to access a file stored at the file server from the mobile device. With no access to the file server, the user may be unsuccessful in accessing the file in the initial attempt. The user may then use the display of the media device that may access the file server to locate the file on the file server to download from the media device. In some embodiments, the media device may be the same device as the file server. The media device in turn may launch the file convert to download the file from the file server and then to convert the file into a stream of QR codes.

To generate the stream of QR codes, the file converter of the media device may first encode the file into a long string. The file converter may then divide the long string into multiple portions based on a content limit of the QR code. The content limit of a single QR code may be 3 kilobytes at maximum. With the long string divided into multiple portions, the file converter may convert each portion into a single QR code image and may insert sequence information into each QR code image. The sequence information may specify the order of the QR code image. If length of the stream of QR codes is above a threshold length, the media device may display a prompt warning the user of a potentially long download time. The file converter may combine all the QR code images generated for the requested file to form a stream of QR code images. The file converter may also generate an initial QR code image to prefix to the stream of QR code images. The initial QR code image may include information on an identifier of the media device (e.g., Internet Protocol (IP) address, Media Access Control (MAC) address, or a Bluetooth Universally Unique Identifier (UUID), etc.) and a total length of QR code images in the stream.

Once the QR code images are combined, the media device may render the initial QR code image of the stream onto the display of the media device for scanning by the mobile device. The initial QR code image may be rendered and presented on the display of the media device for a predefined amount of time (e.g., 10 to 45 seconds). During the predefined amount of time, an image scanner of the mobile device may be pointed by the user at the display of the media device to scan the prefixed initial QR code. Using the information imprinted in the initial QR code, the mobile device may initiate establishment of communications with the media device (e.g., using Internet or the Bluetooth) for downloading the request file.

If the attempt to establish communications with the media device is successful, the mobile device may continue to scan the stream of QR code images from the media device in a "controlled mode." With communications established with the media device, the file downloader running on the mobile device may first send a start signal to the media device. Receipt of the start signal may trigger the media device to initiate playing of the stream of QR code images on the display. Each time the mobile device scans the QR code image, the file downloader may interpret the QR code image and construct the requested file. The file downloader may also send back an acknowledgement signal to the media device. In the meanwhile, the media device may wait for receipt of the acknowledgement signal. Upon receipt of the acknowledgement signal, the media device may play the next QR code image in the stream. If the QR code image is sent in the wrong sequence, the file downloader may request the expected QR code image in the sequence in the stream.

On the other hand, if the attempt to establish communications with the media device is unsuccessful, the mobile device may continue to scan the stream of QR code images from the media device in an "easy mode." Instead of communicating acknowledgment signal each time a QR code image is scanned, the media device may play the stream of QR code images. Each time a new QR code image appears on the display, the mobile device may scan the QR code image and may interpret the scanned QR code image to compose the requested file. If any QR code image in the stream is not scanned, the mobile device may scan the stream of QR code image again when the stream is replayed at a subsequent time. In either the controlled mode or the easy mode, the mobile device may be able to construct the requested file without direct access or communicative connection with the file server storing the file.

Figure 2A:
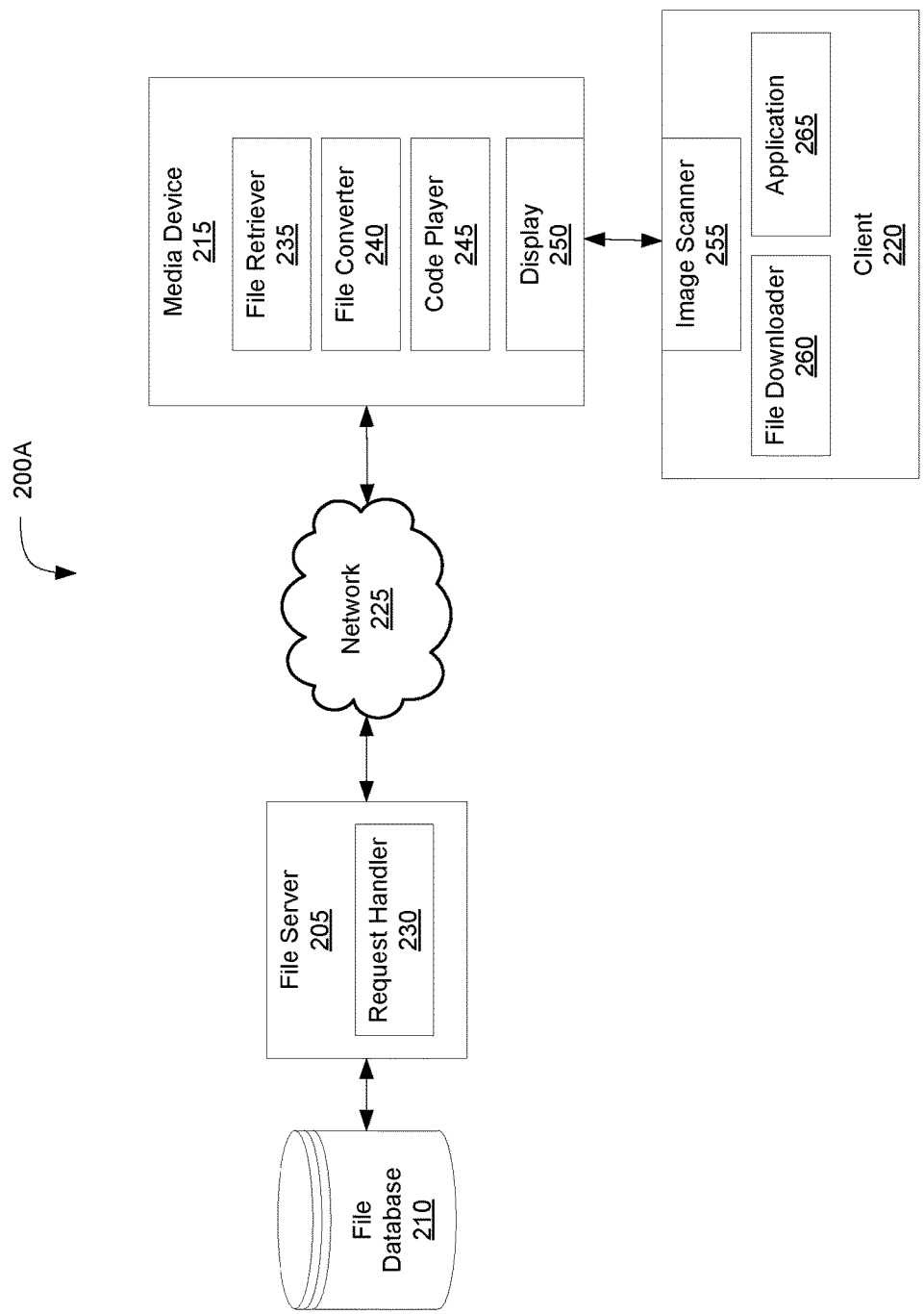
FIGS. 2A and 2B are block diagrams of embodiments of a system for transferring a file to a mobile device via scanning quick response codes displayed via a display output device.

Referring now to FIG. 2A, depicted is a block diagram of an embodiment of a system 200A for transferring a file to a mobile device via scanning quick response codes displayed via a display output device. In brief summary, the system 200 may include a file server 205, a file database 210, a media device 215 (a smart television, a monitor, a laptop, or a computer with a monitor, etc.), and a client 220 (e.g., a smartphone, tablet, laptop, or an Internet-of-Things (IoT)

device, etc.). The file server 205 may include a request handler 230. The file database 210 may include one or more files. The file database 210 may include a single data repository or multiple data repositories. The media device 215 may include a file retrieve 235, a file converter 240, a code player 245, and a display 250 (e.g., touchscreen). The client 220 may include an image scanner 255 (e.g., a camera, an infrared sensor, an ultraviolet sensor, a bar code scanner, etc.). The client 220 may also include a file downloader 260 and an application 265.

Each of the above-mentioned elements or entities is implemented in hardware, or a combination of hardware and software, in one or more embodiments. Each component of the system 200a may be implemented using hardware or a combination of hardware or software detailed above in connection with FIGS. 1A-1D. For instance, each of these elements or entities can include any application, program, library, script, task, service, process or any type and form of executable instructions executing on hardware of the file server 205, the media device 215, the client 220, and the file database 210s. The hardware includes circuitry such as one or more processors in one or more embodiments.

In this context, the file server 205 and the media device 215 may be connected via a network 225, whereas the client 220 may remain unconnected to the network 225. The file server 205 may be in communication with, connected to, or otherwise have direct access to the file database 210. As the media device 215 and the file server 205 may be connected to the network 225, the media device 215 may access files and other data through the network 225, such as the files stored on the file database 210. In some embodiments, the network 225 may be a private network or an Intranet network, such as a virtual private network (VPN) not accessible to the client 220. In some embodiments, the network 225 may be an Internet connection between the file server 205 and the media device 215 not otherwise directly accessible to the client 220. On the other hand, as the client 220 may remain unconnected to the network 225 and may not directly access the file server 205 or the file database 210. The client 220 may be in the presence of, within proximity of, or otherwise have direct line of sight with the media device 215.

As such, when a user of the client 220 attempts to access a file stored on the file database 210, the client 220 may not have direct access to the file database 210 or the file server 205, and may be unable to download the file. The client 220 may prompt the user via a display of the client 220 to use a nearby device with access to the network 225, such as the media device 215, to access the requested file. In turn, the user may approach the media device 215 and may use an input/output device of the media device 215 to access the file. The media device 215 and/or the client 220 may prompt the user to use the image scanner 255 of the client 220 to scan images presented on the display 250 to construct the requested file at the client 220. The following details the process, method, and functionalities of the file server 205, the media device 215, and the client 220 to allow the client 220 access to the file stored at the file database 210 not directly accessible to the client 220.

In further detail, the file retriever 235 of the media device 215 may receive a request to access a file on the file server 205. The requested file may be stored on the file server 205 or the file database 210. The requested file may be of any format, such as an executable (e.g., EXE, CMD, or BAT, etc.), a document (e.g., HTML, ASP, DOC, DOCX, XLS, XLS, PPT, PPTX, RTF, or TXT, etc.), and a media file (e.g., JPEG, GIF, BMP, AVI, MPG, MKA, FLV, WAV, WMA, OGG, etc.), among others. In some embodiments, the file retriever 235 may receive the request to access the file on the file server 205 via selection of a user interface element. In some embodiments, the user interface element may be displayed via the display 250 of the media device 215. The user interface element may include a graphical user interface (e.g., a menu, a set of icons, a list, a directory, etc.) identifying or listing one or more files accessible by the file server 205 or stored at the file database 210 accessible by the file server 205. In some embodiments, the selection of the user interface element may be received via an input/output device (e.g., pointing device, keyboard, microphone, motion sensor, touchscreen, etc.) connected to the media device 215 or the display 250. Through selection of one of the files identified in the graphical user interface, the file retriever 235 may receive the request to access the file. The request may include a file address corresponding to the file. The file address may be, for example, a Uniform Resource Locator (URL) in the form of a protocol (e.g., http, ftp, etc.), a hostname (corresponding to the file server 205 and/or the file database 210), and a file pathname (identifying the specific requested file). In some embodiments, the request may include multiple file addresses, each corresponding to a requested file. Once the request to access the file is received, the file retriever 235 may send the request to the file server 230 via the network 225.

Subsequently, the request handler 230 of the file server 205 may receive the request to access the file from the file retriever 235. Upon receipt of the request to access the file, the request handler 230 may parse the request and may identify the requested file stored on the file database 210. The file database 210 may be a part of the file server 205, connected to the file server 205, or otherwise accessible by the file server 205. In some embodiments, the request handler 230 may parse the file address included in the request to identify the requested file stored on the file database 210. The file address may correspond to a file stored on the file database 210. In some embodiments, the one or more file addresses included in the request may each correspond to a file stored at the file database 210. Once the requested file is identified, the request handler 230 may access the file database 210 to retrieve the requested file. Upon retrieval of the file from the file database 210, the request handler 230 may send the request file to the media device 215 via the network 225.

In turn, the file converter 240 of the media device 215 may receive the file received, obtained, or retrieved from the file server 205. The file converter 240 may encode the file obtained from the file server 205 into a sequence of quick response (QR) codes. In some embodiments, the file converter 240 may generate a string based on the file. In some embodiments, the file converter 240 may encode or convert the received file into the string. The converted string may include a set of alphanumeric values. The file may include set of data specifying instructions for a computing device (e.g., the client 220) or an application (e.g., the application 265) running on the computing device. In some embodiments, the file converter 240 may identify the format of the file. In accordance to the identified format, the file converter 240 may read the requested file. While reading the set of data included in the file, the file converter 240 may the read portion of the data (e.g., binary data in the form of bytes or words) to a set of alphanumeric characters to form the string.

Using the string converted from the file, the file converter 240 may divide the string into one or more parts based on a content limit of each QR code of the sequence. In some embodiments, the file converter 240 may determine the content limit for each QR code of the sequence for the file. The content limit for a single QR code may vary based on a module size of the QR code image to be displayed (e.g., ranging from 21×21 to 177×177) and a level of error correction applied (low, medium, quartile, high), among other factors. For example, if the module size of is 101×101 and the level of error correction applied is high, the content limit of the QR code image may be 3,248 for bits, 1,108 numeric-only, 672 alphanumeric, and 461 bytes. In some embodiments, the file converter 240 may identify a pre-specified module size. In some embodiments, the file converter 240 may identify a pre-specified level of error correction. In some embodiments, the file converter 240 may dynamically determine the module size and/or the level of correction based on a configuration (e.g., a resolution, a size, etc.) of the display 250. Based on the determined content limit, the file converter 240 may divide the string into the one or more parts. Each part may include a subset of the alphanumeric characters forming the converted string. Using the example above, the file converter 240 may divide the string into portions, each with 672 alphanumeric characters.

Prior to dividing the string, in some embodiments, the file converter 240 may insert additional information into one or more positions in the string based on the determined content limit. The additional information may include sequence numbers specifying an order that the to-be generated QR code corresponding to the part is to be presented on the display 250. For example, the first part of the string may be modified to include the sequence number of "0" and the second part of the string may be modified to include the sequence number of "1", and so forth. The file converter 240 may identify the one or more positions in the string to insert the additional information based on the determined content limit. In some embodiments, the one or more positions may be at an interval within the string equal to the determined content limit. In some embodiments, the one or more positions may be identified to interleave the additional information such that the additional information occurs at least once in each part of the string. Once the one or more positions are identified, the file converter 240 may insert the additional information at the identified positions within the string. The file converter 240 may then divide the string into the one or more parts.

Having divided the string into one or more parts, the file converter 240 may convert each part into a QR code for the sequence. In some embodiments, the file converter 240 may generate each QR code for the sequence using the corresponding string based on the module size and the level of error correction used in determining the content length. Each QR code may include a fixed pattern, format portion, and a message portion. The fixed portion may include a plurality of dark and light boxes. The format portion may include an encoding mode, a message length, and the level of error correction, among others. The message portion may include a pattern that may include a specified set of dark squares and a specified set of light squares. For each divided part of the string, the file converter 240 may generate a set of binary codes, such as binary Bose-Chaudhuri-Hocquenghem (BCH) codes or binary Reed-Solomon codes, among others. In some embodiments the file converter 240 may calculate or generate the set of binary codes based on the level of error correction used to determine the content limit. With the generated set of binary codes, the file converter 240 may generate the pattern for the message portion of the QR code. The file converter 240 may apply a preset mask pattern to generate the message portion of the QR code to the set of binary codes (e.g., by using an exclusive-or operator). In some embodiments, message portion of the QR code may include the additional information, such as the sequence number for the QR code. The file converter 240 may traverse through all the parts of the string and repeat this process.

Once all of the one or more parts are converted into the respective QR code, the file converter 240 may combine the QR codes into the sequence of QR codes. In some embodiments, the file converter 240 may generate a stream of QR codes by combining all the QR codes converted from the one or more parts of the string. In some embodiments, the file converter 240 may generate a sequence of image files (e.g., JPG, GIF, BMP, or TIFF, etc.) for each of the QR codes in the stream. In some embodiments, the file converter 240 may generate a video file (e.g., MPG, AVI, MKV, or OGG, etc.) for the stream of QR codes. In some embodiments, the file converter 240 may identify the sequence number for each QR code. In accordance to the identified sequence numbers, the file converter 240 may arrange the QR codes into the stream.

The file converter 240 may also generate an initial QR code to prefix to sequence of QR codes generated from the file, prior to or after combining the QR codes. In some embodiments, the file converter 240 may generate a string for the initial QR code. The string may include information for the client 220 to process the subsequent sequence of QR codes. In some embodiments, the information for the client 220 may be for establishing communications with the media device 215. The information for establishing communications may include an identifier of the media device (e.g., Internet Protocol (IP) address, Media Access Control (MAC) address, or a Bluetooth Universally Unique Identifier (UUID), etc.) and a specified communications protocol (etc., Internet, Bluetooth, or Near Field Communications (NFC), etc.), among others. The information may include a length of the sequence of QR codes to follow for the file. Once the string is generated, the file converter 240 may generate the initial QR code. In some embodiments, the file converter 240 may generate the initial QR code using the string based on the module size and the level of error correction used in determining the content length. The initial QR code may include a fixed pattern, format portion, and a message portion. The file converter 240 may generate the message portion. The message portion may include a pattern that may include a specified set of dark squares and a specified set of light squares.

For the string including the information for the initial QR code, the file converter 240 may generate binary codes, such as binary Bose-Chaudhuri-Hocquenghem (BCH) codes or binary Reed-Solomon codes, among others. In some embodiments the file converter 240 may calculate or generate the set of binary codes based on the level of error correction used to determine the content limit. The file converter 240 may apply a preset mask pattern to generate the message portion of the QR code to the set of binary codes (e.g., by using an exclusive-or operator). The message portion of the initial QR code may include the information for the client 220 to establish communications with the media device 215 and the length of the sequence of QR codes to follow for the file. The file converter 240 may then add, insert, or prefix the initial QR code prior to the sequence of QR codes generated from the file. In some embodiments, the file converter 240 may set or a predetermined time limit in which the client 220 is to establish communications with the media device 215 upon scanning the initial QR code.

With the requested file converted to the sequence of QR codes, the code player 245 of the media device 215 may display the sequence of QR codes via the display 250. The code player 245 may first display the initial QR code, prior to presenting the sequence of QR codes for the file. In some embodiments, the code player 245 may present a prompt on the display 250 notifying the user to point the image scanner 255 of the client 220 toward the display 250. In some embodiments, the code player 245 may display the initial QR code for the predetermined time limit (e.g., 10 to 60 seconds). During the predetermined time limit, the code player 245 may wait for a request to establish communications from the client 220. In some embodiments, the code player 245 may maintain a timer to keep track of time that the initial QR code is presented on the display 250. The code player 245 may use the timer to determine whether the predetermined time limit has elapsed. If the client 220 and the code player 245 establish communications with each other within the predetermined time limit, the media device 215 may wait for a start signal from the client 220 prior to playing the sequence of QR codes. On the other hand, if the client 220 and the media device 225 do not establish communications with each other within the predetermined time limit, the media device 215 may proceed to play the sequence of QR codes. Functionalities of the client 220 and the media device 215 in both conditions are detailed below.

As the initial QR code is presented on the display 250 for the duration of the predetermined time limit, the image scanner 255 of the client 220 may scan, capture, or otherwise acquire an image of the display 250. The image may include the initial QR code. The image scanner 255 of the client 220 may be pointed by the user toward the display 250 of the media device 125 to scan the initial QR code. Once the image is acquired, the file downloader 260 may parse the image of the display 250 to identify the initial QR code. In some embodiments, the file downloader 260 may apply image recognition algorithms (e.g., edge or blob detection, etc.) to identify the initial QR code from the image acquired by the image scanner 255. In some embodiments, the image recognition algorithms may be applied to recognize one or more edges of the initial QR code. The file downloader 260 may again apply image recognition algorithms (e.g., object recognition, etc.) on the identified initial QR code to extract the information encoded therein. In some embodiments, the image recognition algorithms may be applied to recognize the content within the edges of the initial QR code.

With the initial QR code identified from the image, the file downloader 260 may identify the fixed portion, the format portion, and the message portion of the initial QR code. The file downloader 260 may interpret the message portion and may extract the encoded information. In some embodiments, the file downloader 260 may determine or decode the information from the message portion of the initial QR code. The file downloader 260 may generate or recover the binary codes (e.g., Bose-Chaudhuri-Hocquenghem (BCH) codes or Reed-Solomon codes) from the identified message portion. In some embodiments, the file downloader 260 may apply a preset unmask pattern to the message portion to recover the binary codes (e.g., by using an exclusive-or operator). Using the generated binary codes, the file downloader 260 may then generate or recover the alphanumeric characters forming the string. In some embodiments, the file downloader 260 may apply the level of the error correction specified in the format portion of the initial QR code to the message portion to recover the alphanumeric characters. Using the string extracted from the message portion, the file downloader 260 may identify the information for establishing communications with the media device 215. In some embodiments, the file downloader 260 may identify the length of the sequence of QR codes.

Using the information for establishing communications with the media device 215, the client 220 may initiate communications with the media device 215. In some embodiments, the file downloader 260 may identify the identifier of the media device 215 (e.g., Internet Protocol (IP) address, Media Access Control (MAC) address, or a Bluetooth Universally Unique Identifier (UUID), etc.). In some embodiments, the file downloader 260 may identify the communications protocol for establishing the communications. The client 220 may then initiate communications using the specified communications protocol. Once initiated, the client 220 may establish communications with the media device 215 using the identifier for the media device 215 identified from the initial QR code. In some embodiments, the client 220 may send an initialization signal to request establishing communications with the media device 215. The code player 245 may receive the initialization signal. The code player 245 of the media device 215 may in turn send a confirmation signal back to the client 220 to complete establishment of the communications between the media device 215 and the client 220. In some embodiments, the code player 245 and/or the file downloader 260 may determine whether communications is successfully established between the media device 215 and the client 220.

If the client 220 establishes communications with the media device 215 within the duration of the predetermined time limit, the code player 245 and the file downloader 260 both may enter a first mode of operation (sometimes referred to as a "controlled mode"). In some embodiments, the file downloader 260 may synchronize scanning and/or interpreting of the sequence of QR codes displayed on the display 250 of the media device 215 with the code player 245. To begin this mode of operation, in some embodiments, the file downloader 260 may transmit a start signal via the established communications. Upon receipt of the start signal from the client 220, the code player 245 may start playing the sequence of QR codes. In some embodiments, the code player 245 may transmit the start signal to the file downloader 260 to indicate to the file downloader 260 to expect starting of playing of the sequence of QR codes.

Subsequently, the code player 245 may initiate playing of the sequence of QR codes. In some embodiments, the code player 245 may sequentially display via the display 250 each QR code in the sequence. Each the QR code is presented on the display 250, the code player 245 may wait for an acknowledgement from the file downloader 260. In some embodiments, the media device 245 may sequentially display the image files generated for each QR code in the stream via the display 250. In some embodiments, the code player 245 may play the video file generated for the stream of QR codes via the display 250.

Each time the QR code is presented on the display 250, the image scanner 255 of the client 220 may scan, capture, or otherwise acquire an image of the display 250. The image may include the QR code. Once the image is acquired, the file downloader 260 may parse the image of the display 250 to identify the QR code. In some embodiments, the file downloader 260 may apply image recognition algorithms (e.g., edge or blob detection, etc.) to identify the QR code from the image acquired by the image scanner 255. In some embodiments, the image recognition algorithms may be applied to recognize one or more edges of the QR code. The file downloader 260 may again apply image recognition algorithms (e.g., object recognition, etc.) on the identified QR code to extract the information encoded therein. In some embodiments, the image recognition algorithms may be applied to recognize the content within the edges of the initial QR code.

With the QR code identified from the image, the file downloader 260 may identify the fixed portion, the format portion, and the message portion of the QR code. The file downloader 260 may interpret the message portion and may extract the encoded information. In some embodiments, the file downloader 260 may determine or decode the information from the message portion of the QR code. The file downloader 260 may generate or recover the binary codes (e.g., Bose-Chaudhuri-Hocquenghem (BCH) codes or Reed-Solomon codes) from the identified message portion. In some embodiments, the file downloader 260 may apply a preset unmask pattern to the message portion to recover the binary codes (e.g., by using an exclusive-or operator). Using the generated binary codes, the file downloader 260 may then generate or recover the alphanumeric characters forming the corresponding part of the string originally encoded from the requested file. In some embodiments, the file downloader 260 may apply the level of the error correction specified in the format portion of the QR code to the message portion to recover the alphanumeric characters. From the part of the string extracted from the message portion of the QR code, the file downloader 260 may construct the corresponding part of data to form the file (e.g., binary data in the form of bytes or words). In addition, the file downloader 260 may identify the sequence number of the QR code from the alphanumeric characters recovered from the message portion. The file downloader 260 may repeat this functionality as more and more QR codes are scanned and processed to reconstruct the entirety of the requested file at the client 220.

Upon construction of the part of the data for the file corresponding to the information extracted from the QR code presented on the display 250, the file downloader 260 may transmit an acknowledgement signal via the communications established with the media device 215. The acknowledgement signal may indicate to the code player 245 that the file downloader 260 successfully decoded the currently presented QR code. The acknowledgement signal may indicate whether the current QR code scanned is in order or out of order. In some embodiments, the file downloader 260 may determine whether the sequence number identified from the scanned QR code is in order for the sequence of QR codes. In some embodiments, the file downloader 260 may compare the identified sequence number with an expected sequence number. For example, the file downloader 260 may determine that the currently identified sequence number may be two or greater than the previously identified sequence number, and based on the determination identify that the scanned QR code is out of order. The file downloader 260 may determine the expected sequence number each time the QR code is scanned. In some embodiments, the file downloader 260 may maintain a counter by incrementing the sequence number from the previously scanned QR code. In some embodiments, the file downloader 260 may maintain a buffer for the expected sequence number.

If the identified sequence number and the expected sequence number match, the file downloader 260 may transmit the acknowledgment signal with an indicator that current QR code scanned is in order. The acknowledgment signal may include the expected sequence number incremented from the sequence number identified from the current QR code acquired by the image scanner 255. If the identified sequence number and the expected sequence number do not match, the file downloader 260 may determine the expected sequence number. The file downloader 260 may also transmit the acknowledgement signal with an indicator that the current QR code scanned is out of order. The acknowledgement signal may include the expected sequence number. In some embodiments, the acknowledgement signal may include a request for the QR code of the expected sequence number.

Subsequently, the code player 245 may receive the acknowledgment signal from the file downloader 260. Upon receipt of the acknowledgement signal, the code player 245 may identify the next QR code to present on the display 250. In some embodiments, the identification of the next QR code to present may be based on the counter maintained by the code player 245. The code player 245 may update or increment the counter each time the QR code of the sequence is presented on the display 250. In some embodiments, the code player 245 may identify the sequence number of the QR code within the sequence currently presented on the display 250. Once the sequence number is identified, the code player 245 may then increment the sequence number to determine the next sequence number for the next QR code to be presented on the display 250.

In some embodiments, by parsing the acknowledgment signal, the code player 245 may identify the next QR code to be presented on the display 245. The code player 245 may determine whether the file downloader 260 processed the QR code in order or out of order based on the acknowledgment signal. In some embodiments, the code player 245 may parse the acknowledgement signal to identify indicator. In some embodiments, the code player 245 may identify the next QR code to present based on the expected sequence number indicated in the acknowledgement signal. In some embodiments, the code player 245 may compare the expected sequence number indicated in the acknowledgement signal with a value of the counter. If the value of the counter matches the expected sequence number, the code player 245 may determine that the file downloader 260 processed the QR code in order and may increment the counter to identify the next sequence number of the QR code to be presented on the display 250. If the value of the counter does not match the expected sequence number, the code player 245 may determine that the file downloader 260 processed the QR code out of order and may use the expected sequence number from the acknowledgement signal to identify the next QR code to present on the display 250. In some embodiments, upon the receipt of the next acknowledgement signal from the file downloader 260, the code player 245 may continue again from the QR code subsequent to the previously scanned QR code.

Using the sequence number identified from the counter or from the acknowledgment signal, the code player 245 may determine whether all the QR codes in the sequence have been scanned and processed by the file downloader 260. In some embodiments, the code player 245 may compare the sequence number with the length of the sequence of QR codes. If the identified sequence number is less than the length of the sequence of QR codes, the code player 245 may identify the QR code corresponding to the identified sequence number. Once identified, the code player 245 may present the QR code on the display 250. Furthermore, the above detailed functionalities of the client 220 and the media player 215 in the first mode of operation may be repeated for the subsequent QR code. In contrast, if identified sequence number equals the length of the sequence of QR codes, the code player 245 may transmit a termination signal indicating to the file downloader 260 that the sequence of QR codes scanned is complete. Upon receipt of the termination signal, the file downloader 260 may construct the entirety of the requested file from the aggregated information extracted from all of the scanned and processed QR codes.

On the other hand, if the client does 220 does not establish communications with the media device 215 within the duration of the predetermined time limit, the code player 245 and the file downloader 260 both may enter a second mode of operation (sometimes referred to as an "easy mode"). The second mode of operation may different from the first mode of operation, in that no start signal, acknowledgement signals, or termination signals are exchanged. In some embodiments, the file downloader 260 may continue scanning and/or interpreting of the sequence of QR codes displayed on the display 250 of the media device 215 without any synchronization with the code player 245. Subsequently, the code player 245 may initiate playing of the sequence of QR codes, each for a predetermined time period (e.g., 5 to 45 seconds). In some embodiments, the code player 245 may sequentially display via the display 250 each QR code in the sequence for the predetermined time period. In some embodiments, the media device 245 may sequentially display the image files generated for each QR code in the stream via the display 250 for the predetermined time period. In some embodiments, the code player 245 may play the video file generated for the stream of QR codes via the display 250.

Each time the QR code is presented on the display 250, the image scanner 255 of the client 220 may scan, capture, or otherwise acquire an image of the display 250. The image may include the QR code. Once the image is acquired, the file downloader 260 may parse the image of the display 250 to identify the QR code. In some embodiments, the file downloader 260 may apply image recognition algorithms (e.g., edge or blob detection, etc.) to identify the QR code from the image acquired by the image scanner 255. In some embodiments, the image recognition algorithms may be applied to recognize one or more edges of the QR code. The file downloader 260 may again apply image recognition algorithms (e.g., object recognition, etc.) on the identified QR code to extract the information encoded therein. In some embodiments, the image recognition algorithms may be applied to recognize the content within the edges of the initial QR code.

With the QR code identified from the image, the file downloader 260 may identify the fixed portion, the format portion, and the message portion of the QR code. The file downloader 260 may interpret the message portion and may extract the encoded information. In some embodiments, the file downloader 260 may determine or decode the information from the message portion of the QR code. The file downloader 260 may generate or recover the binary codes (e.g., Bose-Chaudhuri-Hocquenghem (BCH) codes or Reed-Solomon codes) from the identified message portion. Using the generated binary codes, the file downloader 260 may then generate or recover the alphanumeric characters forming the corresponding part of the string originally encoded from the requested file. In some embodiments, the file downloader 260 may apply a preset unmask pattern to the message portion to recover the binary codes (e.g., by using an exclusive-or operator). In some embodiments, the file downloader 260 may apply the level of the error correction specified in the format portion of the QR code to the message portion to recover the alphanumeric characters. From the part of the string extracted from the message portion of the QR code, the file downloader 260 may construct the corresponding part of data to form the file (e.g., binary data in the form of bytes or words). In addition, the file downloader 260 may identify the sequence number of the QR code from the alphanumeric characters recovered from the message portion. The file downloader 260 may repeat this functionality as more and more QR codes are scanned and processed to reconstruct the entirety of the requested file at the client 220.

The file downloader 260 may determine whether the sequence number identified from the scanned QR code is in order for the sequence of QR codes. In some embodiments, the file downloader 260 may compare the identified sequence number with an expected sequence number. For example, the file downloader 260 may determine that the currently identified sequence number may be two or greater than the previously identified sequence number, and based on the determination identify that the scanned QR code is out of order. The file downloader 260 may determine the expected sequence number each time the QR code is scanned. In some embodiments, the file downloader 260 may maintain a counter by incrementing the sequence number from the previously scanned QR code. In some embodiments, the file downloader 260 may maintain a buffer for the expected sequence number. If the identified sequence number and the expected sequence number match, the file downloader 260 mark the sequence of QR codes as in order or complete. On the other hand, if the identified sequence number and the expected sequence number do not match, the file downloader 260 may mark the sequence of QR codes as out of order or incomplete. In some embodiments, the file downloader 260 may determine the expected sequence number. The file downloader 260 may store the sequence numbers not received and processed for the sequence of QR codes for the requested file. In some embodiments, the file downloader 260 may store the sequence numbers successfully received and processed for the sequence of QR codes for the requested file.

Without any communications established between the client 220 and the media device 215, the code player 245 may continue to present the sequence of QR codes on the display 250. The code player 245 may identify the next QR code in the sequence to present on the display 250. In some embodiments, the code player 245 may determine whether all the QR codes in the sequence have been scanned and processed by the file downloader 260. In some embodiments, the code player 245 may compare the sequence number with the length of the sequence of QR codes. If the identified sequence number is less than the length of the sequence of QR codes, the code player 245 may identify the next QR code and may present the identified QR code on the display 250. Furthermore, the above detailed functionalities of the client 220 and the media player 215 in the second mode of operation may be repeated for the subsequent QR code.

In contrast, if identified sequence number equals the length of the sequence of QR codes, the code player 245 may present a terminal image on the display 250. In some embodiments, the terminal image may be the original graphical user interface prior to playing of the sequence of QR codes. In some embodiments, the terminal image may be a predefined QR code. The message portion of the predefined QR code may include information indicating to the file downloader 260 that the sequence of QR codes is complete. The image scanner 255 of the client may scan, capture, or acquire the terminal image. Using image recognition algorithms, the file downloader 260 may identify information indicating that the sequence of QR codes is complete. Upon recognition of the terminal image, the file downloader 260 may determine whether all of the QR codes in the sequence were scanned and processed. In some embodiments, the file downloader 260 may identify the one or more sequence numbers not received and processed for the sequence of numbers. If there are any sequence numbers identified as not received and processed, the file downloader 260 may determine that not all of the QR codes in the sequence were received and processed. In addition, the file downloader 260 may mark the constructed data for the requested file as incomplete. The file downloader 260 may wait for another replay of the sequence of QR codes for the requested file to complete reconstruction of the file. If no sequence numbers are identified as not received and processed, the file downloader 260 may determine that all of the QR codes in the sequence were received and processed. In addition, the file downloader 260 may mark the constructed data for the requested file as complete. The file downloader 260 may also reconstruct the entirety of the requested file from the aggregated information extracted from all of the scanned and processed QR codes.

Once the processing of the sequence of QR codes is complete in the first or second mode operation, the application 265 of the client 220 may open the requested file reconstructed by the file downloader 260. The application 265 may identify the format of the reconstructed file. In accordance to the specifications of the identified format, the application 265 may open and play the reconstructed file. In some embodiments, the client 220 itself (e.g., using an operating system running on the processor) may execute the file reconstructed by the file downloader 260. In this manner, the client 220 may open, play, or otherwise execute files stored at the file database 210 not directly accessible to the client 220. In some cases, the client 220 may be able to access the requested from the database 210 quicker than otherwise.

Figure 2B:
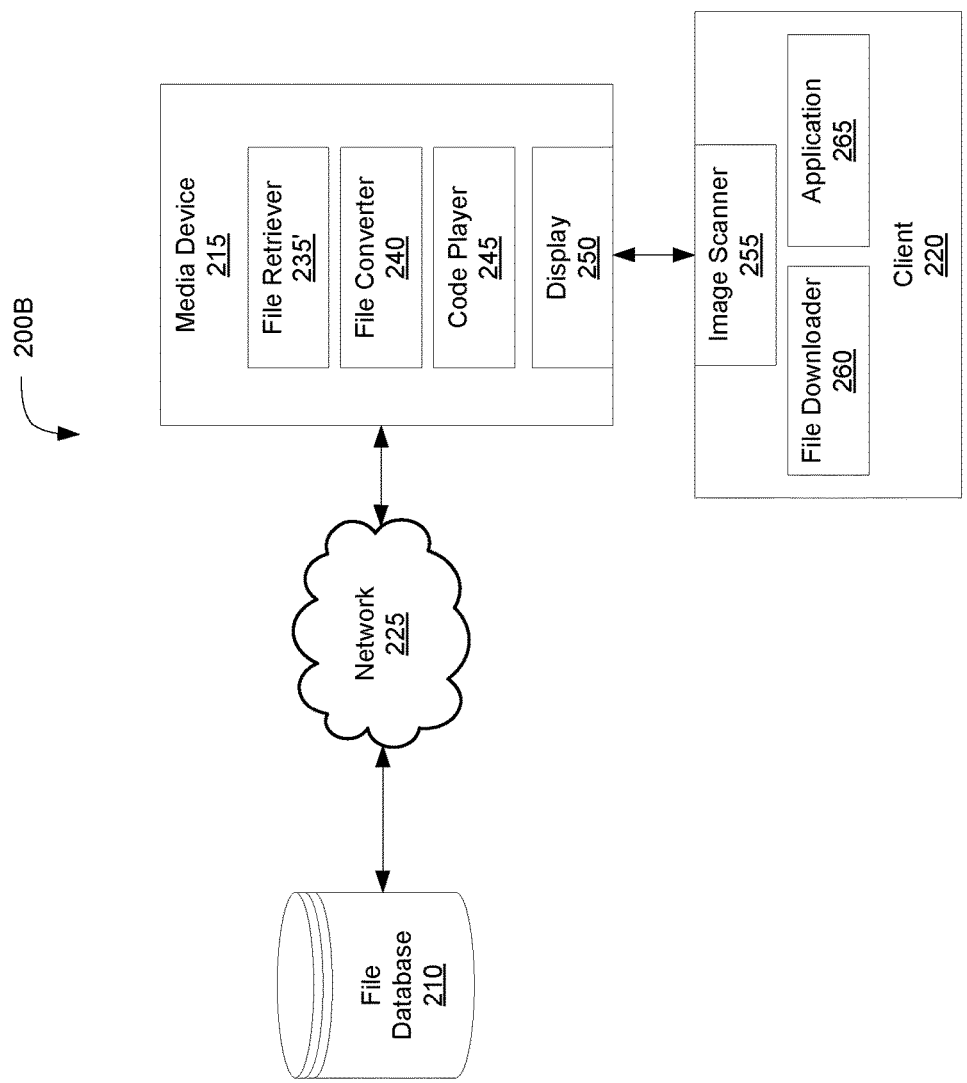

Referring now to FIG. 2B, depicted is a block diagram of another embodiment of a system 200B for transferring a file to a mobile device via scanning quick response codes displayed via a display output device. The system 200B may be similar to the system 200A, but may lack a file server 205 separate from the media device 215. In some embodiments, the file server 205 or the file database 210 may be a part of the media device 215. In some embodiments, the file server 205 may include the media device 215. In some embodiments, the file database 210 may be connected to the media device 215 or may be otherwise directly accessible from the media device 215 (e.g., via the network 225). In such embodiments, the file retriever 235' of the media device 215 may include functionalities of the file server 205, such as those of the request handler 230.

Figure 3A:
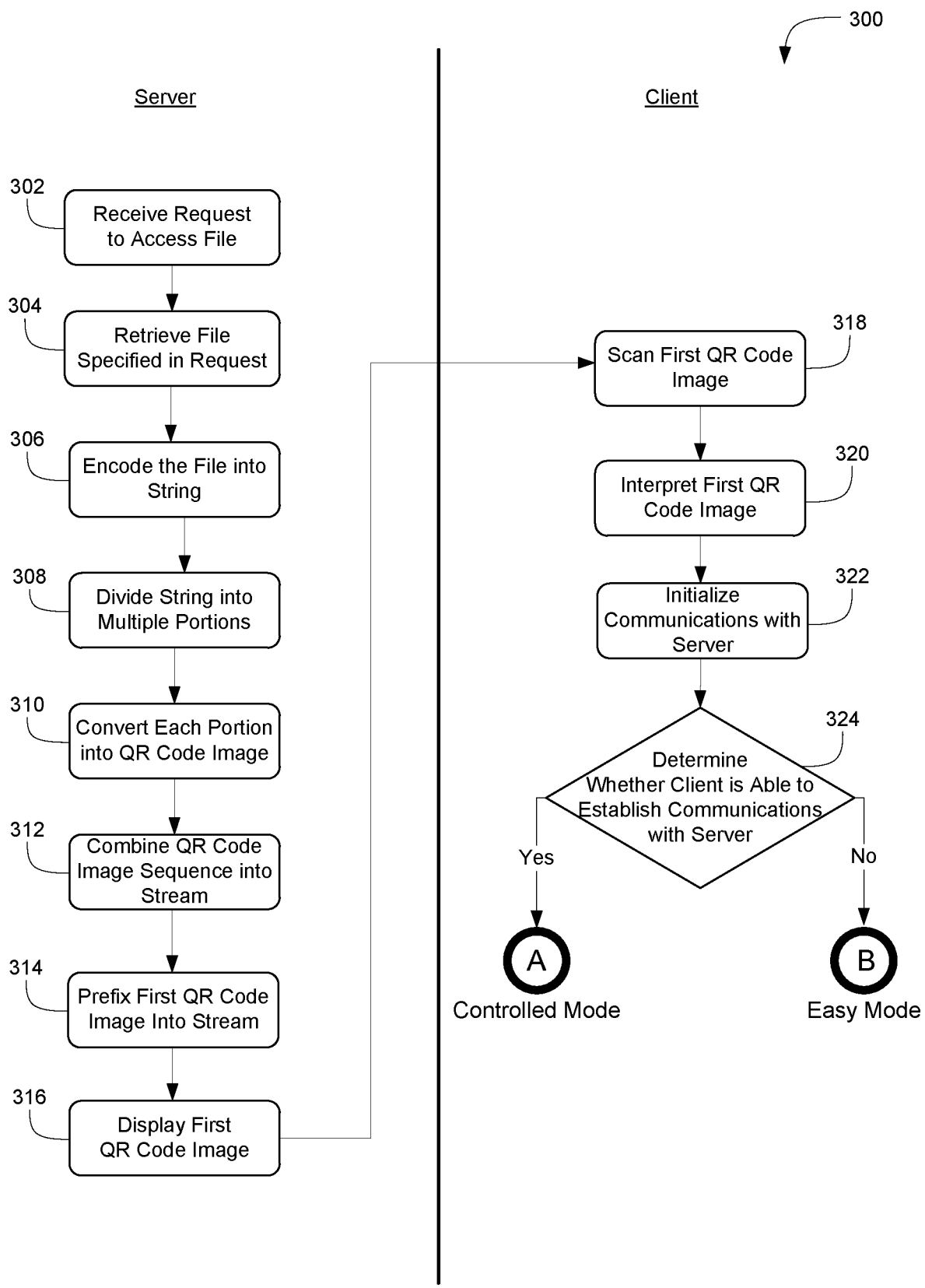
FIG. 3A-3C are flow diagrams of an embodiment of a method of transferring a file to a mobile device via scanning quick response codes displayed via a display output device.
Figure 3B:
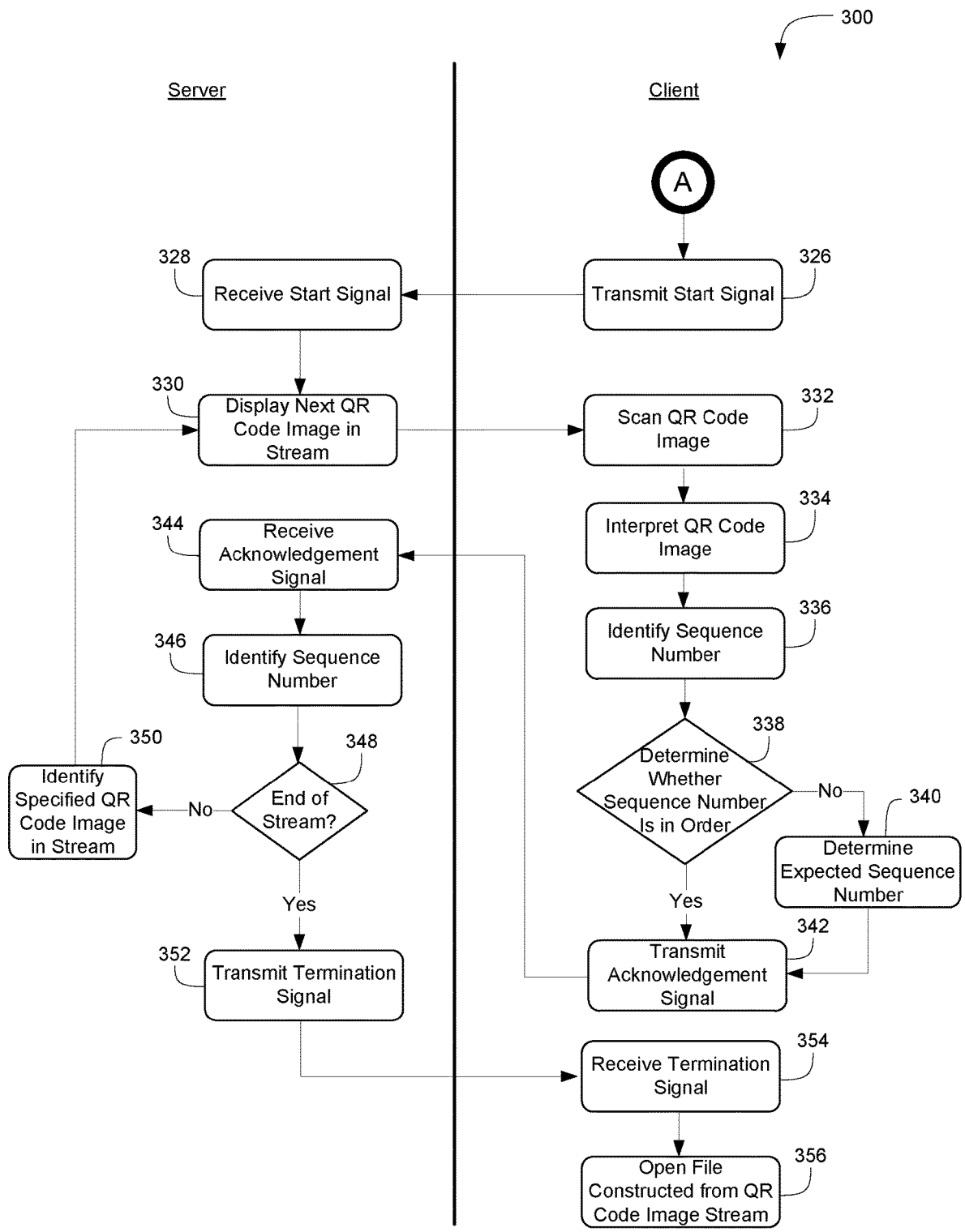
Figure 3C:
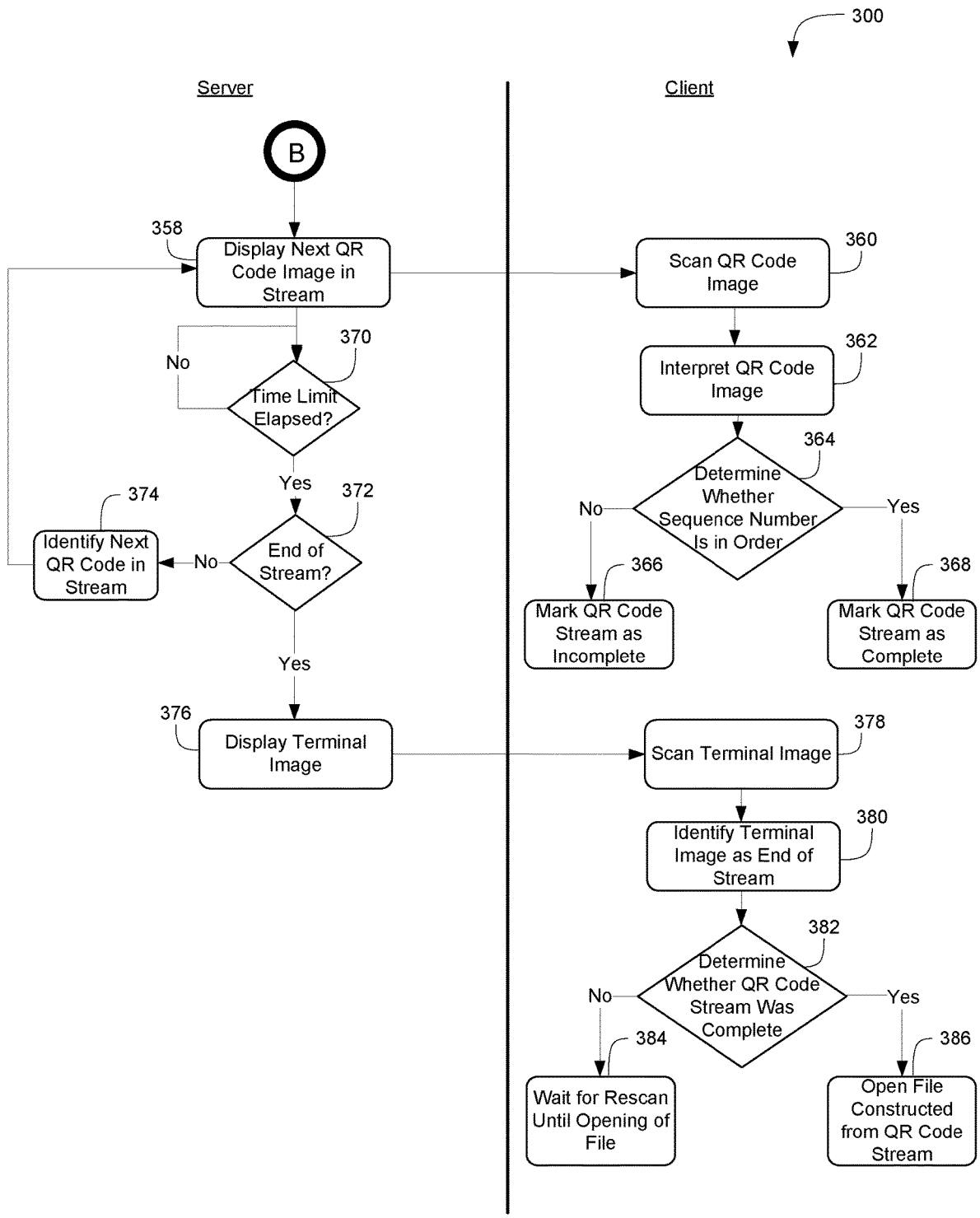

Referring now to FIGS. 3A-3C, depicted is a flow diagram of an embodiment of a method 300 for deploying updates to multiple entities. The operations and functionalities of the method 300 may be performed by the system 200A or system 200A detailed above, such as the file server 205, the file database 210, the media device 215, and/or the client 220. Starting from FIG. 3A, at step 302, a server may receive a request to access a file. The file may not be directly accessible to the client. At step 304, the server may retrieve the file specified in the request. At step 306, the server may encode the file into a string. At step 308, the server may divide the string into multiple portions. At step 310, the server may convert each portion of the string into a quick response (QR) code image. At step 312, the server may combine all the QR code images each corresponding to the portion of the string to form a stream of QR code images. At step 314, the server may prefix a first QR code image into the stream of QR code images. The first QR code image may include information for establishing communications between the client and the server. At step 316, the server may display the first QR code image of the stream. In turn, at step 318, the client may scan the first QR code image. At step 320, the client may interpret the first QR code image to extract information therefrom. At step 322, the client may initialize communications with the server using the information extracted from the first QR code. At step 324, the client may determine whether the client is able to establish communications with the server. In some embodiments, the functionalities of step 322 and/or 324 may be performed at the server.

If the communications is successfully established between the server and the client, the client may enter into a controlled mode. Moving onto FIG. 3B, at step 326, the client may transmit a start signal. In turn, at step 328, the server may receive the start signal from the client. At step 330, the server may display the next QR code in the stream. At step 332, the client may scan the QR code image displayed at the server. At step 334, the client may interpret the QR code image to decode and extract the string corresponding to the QR code image. At step 336, the client may identify the sequence number from the QR code image. At step 338, the client may determine whether the sequence number is in order in the stream of QR code images. If not, at step 340, the client may determine an expected sequence number. The expected sequence number may be the next number in sequence in the stream of QR code images. At step 342, the client may transmit an acknowledgement signal with the expected sequence number for the next QR code image. At step 344, the server may in turn receive the acknowledgement signal from the client. At step 346, the server may identify the sequence number from the acknowledgement signal. In some embodiments, the server may identify the sequence number from an internal counter maintained to keep track of the stream of QR code images. At step 348, the server may determine whether the end of the stream of QR code images is reached. If not, at step 350, the server may identify the QR code image in the stream as specified by the sequence number and may repeat the functionalities of steps 330-348. If so, at step 352, the server may transmit a termination signal to the client. At step 354, the client in turn may receive the termination signal. At step 356, the client may open a file constructed from the scanned QR code image stream.

On the other hand, if the communications is not successfully established between the server and the client, the client may enter into an easy mode. Moving onto FIG. 3C, at step 358, the server may display the next QR code image in the stream, without any communication link established between the client and the server. In turn, at step 360, the client may scan the QR code image. At step 362, the client may interpret the QR code image to extract information to construct the requested file. At step 364, each time the QR code image is scanned and interpreted, the client may determine whether the sequence number of the scanned QR code image is in order. If not, at step 366, the client may mark the QR code image stream as incomplete. Otherwise, if so, at step 368, the client may mark the QR code image stream as so far complete. In the meanwhile, at step 370, the server may determine whether a time limit for display of the current QR code image has elapsed. If not, the server may wait until the limit elapsed. Once the time limit elapsed, at step 372, the server may determine whether the end of the stream of QR code images is reached. If not, at step 374, the server may identify the next QR code image and may repeat the functionality of steps 358 and 370. If so, at step 376, the server may display a terminal image indicating that the stream of QR code images has ended. At step 378, the client may scan the terminal image. At step 380, the client may identify the terminal image as the end of the stream of the QR code images. At step 382, the client may determine whether the scanned QR code image stream is complete. If marked as incomplete, at step 384, the client may wait for rescan of the stream of QR code images again until opening of the file. At step 386, the client may open the file constructed from the QR code image stream.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, PYTHON, BASIC, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for transferring a file to a mobile device via scanning quick response codes displayed via a display output device, the method comprising:

(a) receiving, by a media device in communication with a server, a request to access a file on the server to provide to a mobile device, the mobile device not configured to directly access the server;

(b) encoding, by a file converter of the media device, the file obtained from the server into a plurality of quick response (QR) codes;

(c) generating, by the file converter, an initial QR code to prefix the plurality of QR codes, the initial QR code including information to establish a communication link with the media device;

(d) displaying, by the file converter, the initial QR code of the plurality of QR codes within a time limit prior to displaying a remainder of the plurality of QR codes;

(e) determining, by the media device, that the mobile device has established the communication link with the media device using the information from the initial QR code displayed for the time limit;

(f) selecting, by the media device responsive to determining that the communication link is established, a first mode to synchronize scanning or interpreting of the plurality of QR codes using the communication link, instead of a second mode to sequentially display the plurality of QR codes without synchronization using the communication link;

(g) displaying, by the media device, responsive to selecting the first mode and while communicating over the communication link established between the media device and the mobile device, the remainder of the plurality of QR codes via a display output device;

(h) scanning, by the mobile device, each of the plurality of QR codes displayed on the display output device;

(i) interpreting, by a file downloader of the mobile device, each of the scanned plurality of QR codes to form the file on the mobile device; and (j) synchronizing, by the file downloader, using the communication link established between the mobile device and the media device, at least one of scanning or interpreting the plurality of QR codes displayed by the display output device of the media device by:
receiving, from the mobile device via the communication link, an indicator that a first QR code of the plurality of QR codes is scanned or interpreted out of sequence; and
providing, to the mobile device, a second QR code of the plurality of QR codes based at least on the indicator.

2. The method of claim 1, wherein the server is in communication with the media device via a network separate from the communication link established between the mobile device and the media device.

3. The method of claim 1, wherein (a) further comprises receiving, by the media device, the request via selection of a user interface element displayed via the display output device.

4. The method of claim 1, wherein (b) further comprises encoding, by the file converter, the file into the plurality of QR codes by:
encoding the file into a string;
dividing the string into a plurality of parts based on a content limit of a QR code; and
converting each of the plurality of parts into one of the plurality of QR codes, each one of the plurality of QR codes comprising a sequence number.

5. The method of claim 1, wherein (b) further comprises combining the plurality of QR codes into a stream of QR codes comprising one of a sequence of files for each of the plurality of QR codes or a video of the plurality of QR codes.

6. The method of claim 1, wherein (g) further comprises displaying each of the plurality of QR codes sequentially for a predetermined time period.

7. The method of claim 1, wherein (h) further comprises scanning, by the mobile device, each of the plurality of QR codes via a camera of the mobile device reading each of the plurality of QR codes as displayed on the display output device.

8. The method of claim 1, wherein (i) further comprises combining, by the file downloader, each of the interpreted scanned plurality of QR codes to form the file.

9. The method of claim 1, wherein (j) further comprises receiving, from the media device via the communication link, a termination signal indicating that the display of the plurality of QR codes is complete; and
wherein (g) further comprises forming, responsive to receiving the termination signal, the file using the scanned plurality of QR codes.

10. The method of claim 1, wherein (j) further comprises using a sequence number included in each QR code to synchronize at least one scanning or interpreting of the plurality of QR codes.

11. A system for transferring a file to a mobile device via scanning quick response codes displayed via a display output device, the system comprising:
a media device in communication with a server, the media configured to:
receive a request to access a file on the server,
encode the file obtained from the server into a plurality of quick response (QR) codes,
generate an initial QR code to prefix the plurality of QR codes, the initial QR code including information to establish a communication link with the media device,
display the initial QR code of the plurality of QR codes within a time limit prior to displaying a remainder of the plurality of QR codes,
determine that the mobile device has established the communication link with the media device using the information from the initial QR code displayed for the time limit,
select, responsive to determining that the communication link is established, a first mode to synchronize scanning or interpreting of the plurality of QR codes using the communication link, instead of a second mode to sequentially display the plurality of QR codes without synchronization using the communication link, and
display, while communicating via the communication link established between the media device and the mobile device, the remainder of the plurality of QR codes via a display output device; and
a mobile device configured to:
scan each of the plurality of QR codes displayed on the display output device,
interpret each of the scanned plurality of QR codes to form the file on the mobile device,
synchronize, using the communication link established between the mobile device and the media device, at least one of scanning or interpreting the plurality of QR codes displayed by the display output device of the media device by:
receiving, from the mobile device via the communication link, an indicator that a first QR code of the plurality of QR codes is scanned or interpreted out of sequence; and
providing, to the mobile device, a second QR code of the plurality of QR codes based at least on the indicator.

12. The system of claim 11, wherein the server is in communication with the media device via a network separate from the communication link established between the mobile device and the media device.

13. The system of claim 11, wherein the media device is further configured to receive the request via selection of a user interface element displayed via the display output device.

14. The system of claim 11, wherein the mobile device is further configured to encode the file into the plurality of QR codes by:
encoding the file into a string;
dividing the string into a plurality of parts based on a content limit of a QR code; and
converting each of the plurality of parts into one of the plurality of QR codes, each one of the plurality of QR codes comprising a sequence number.

15. The system of claim 11, wherein the mobile device is further configured to combine the plurality of QR codes into a stream of QR codes comprising one of a sequence of files for each of the plurality of QR codes or a video of the plurality of QR codes.

16. The system of claim 11, wherein the media device is further configured to display each of the plurality of QR codes sequentially for a predetermined time period.

17. The system of claim 11, wherein the mobile device is further configured to scan each of the plurality of QR codes via a camera of the mobile device reading each of the plurality of QR codes as displayed on the display output device.

18. The system of claim 11, wherein the mobile device is further configured to combine each of the interpreted scanned plurality of QR codes to form the file.

* * * * *